United States Patent [19]

Henderson et al.

[11] 4,094,715
[45] June 13, 1978

[54] METHOD AND APPARATUS FOR APPLYING FOAM INSULATION TO PIPE

[75] Inventors: Stewart Henderson; Ralph Hielema, both of Calgary, Canada

[73] Assignee: Henderwood Industries, Ltd., Calgary, Canada

[21] Appl. No.: 718,394

[22] Filed: Aug. 27, 1976

[51] Int. Cl.² .............................................. B32B 5/18
[52] U.S. Cl. ...................................... 156/78; 138/144; 138/149; 156/195; 156/250; 214/339; 214/DIG. 4; 264/46.3; 264/46.9; 428/36; 428/160; 428/313; 428/425; 427/258; 427/264; 427/335

[58] Field of Search ................. 428/36, 310, 315, 160, 428/425, 313; 248/54 R; 214/338, 339, DIG. 4; 156/78, 79, 195, 250; 138/144, 149; 264/45.8, 48, 321, 46.2, 46.3, 46.9; 427/258, 264, 335

[56] References Cited

U.S. PATENT DOCUMENTS

| | | | |
|---|---|---|---|
| 2,941,570 | 6/1960 | Plym | 156/475 |
| 3,118,800 | 1/1964 | Snelling | 156/195 |
| 3,172,591 | 3/1965 | Norton | 214/339 |
| 3,371,806 | 3/1968 | Anderson | 214/339 |
| 3,480,493 | 11/1969 | Bauer et al. | 156/78 |
| 3,743,124 | 7/1973 | Jarvis | 214/338 |
| 3,877,136 | 4/1975 | Groh et al. | 156/78 |
| 3,979,818 | 9/1976 | Groh et al. | 156/78 |

Primary Examiner—Edward G. Whitby
Attorney, Agent, or Firm—Lowe, Kokjer, Kircher, Wharton & Bowman

[57] ABSTRACT

A method of applying foamed insulation to pipe is contemplated by the present invention. The pipe is moved longitudinally while being rotated about its longitudinal axis. A sprayable, foamable liquid is directed onto the surface of the pipe from a stationary location and is allowed to partially rise before a protective outer jacket is wrapped around the rising foam. The wrapping step includes application of sufficient pressure to the foam to increase the final density thereof, at the outer surface, by from 10% to 25% above the density if the foam was allowed to rise uninhibited.

19 Claims, 8 Drawing Figures

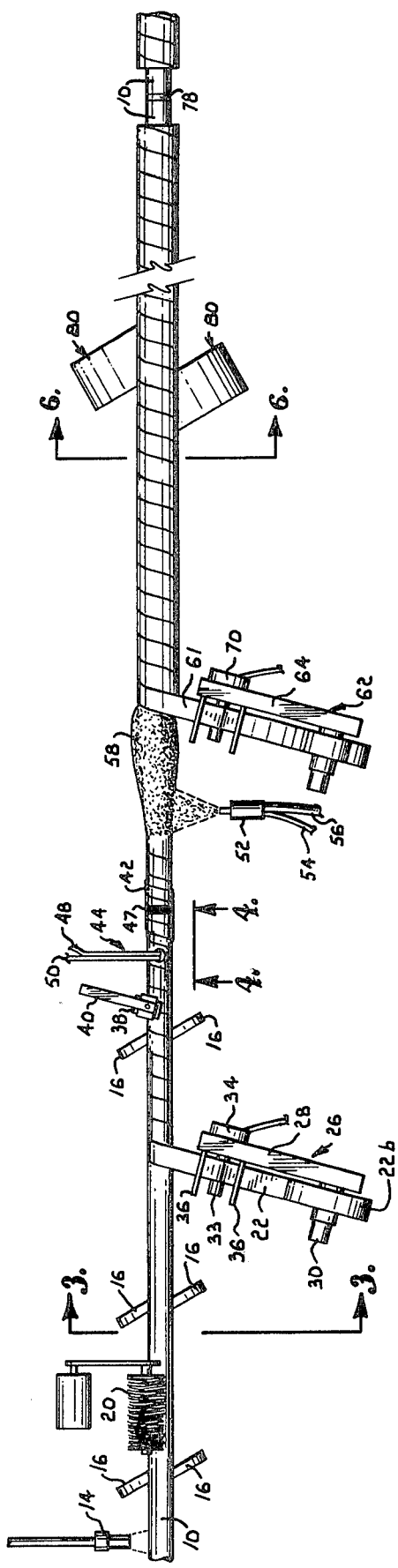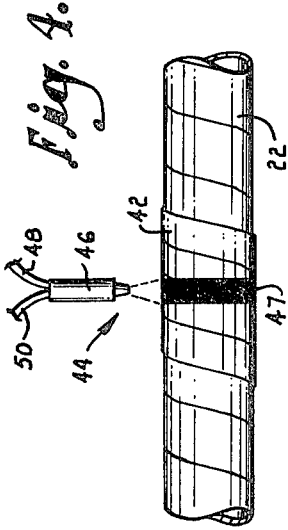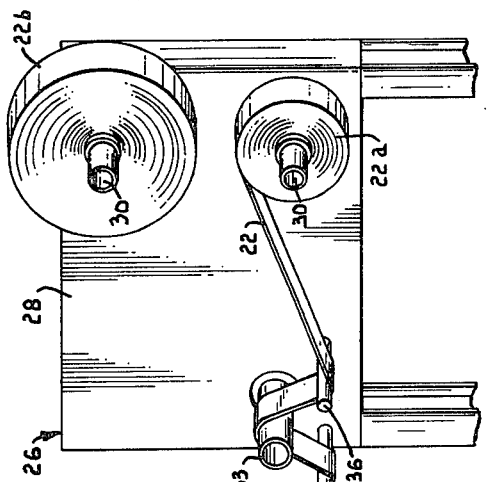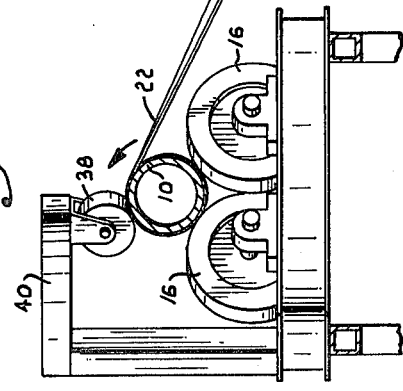

METHOD AND APPARATUS FOR APPLYING FOAM INSULATION TO PIPE

The invention also contemplates a method of marking the line of juncture between two lengths of pipe which have been coupled together for coating purposes. A marking liquid characterized by undergoing vaporization at a temperature below the maximum temperature reached during the exothermic reaction occurring between the foamable liquid and its blowing agent is applied to the pipe in conjunction with application of the foamable liquid. The foamable liquid is allowed to rise and the area in contact with the marking liquid will rise to a greater degree than the remaining liquid as a result of vaporization of the marking liquid during formation of the foam. This provides a ring of larger diameter foam in the location of the line of juncture.

The invention further includes a method and apparatus for handling pipe coated with foam insulation wherein an inflatable member having a casing formed from yieldable rubber-like material and presenting a rounded surface is used to support the coated but not fully cured foam insulated pipe. The inflatable member is adapted to be inflated to a pressure sufficient to support at least a portion of the weight of the length of pipe without damaging the foam insulation or outer coating. A series of the inflatable members may be positioned to receive the pipe as it comes off of the coating line with the first inflatable members which contact the pipe being inflated to a lower pressure than the subsequent inflatable members which contact the pipe.

BACKGROUND OF THE INVENTION

This is a method and apparatus for coating pipe with foamed insulation, a method for marking lengths of pipe coated with foam, and a method and apparatus for handling pipe coated with foamed insulation.

Utilization of insulating jackets around pipe has long been employed in oil recovery and oil transportation. It is often necessary to heat the oil to be able to remove it from the ground and also to lower the viscosity for transportation through pipelines. In most geographical areas the temperature of the heated liquid can be maintained at the desired level only by insulating the pipe through which the oil flows. Other uses of insulated pipe include natural gas recovery, water, steam and sewer pipes.

Many prior art techniques have been developed for enveloping a pipeline in a layer of foamed insulation. Some prior art techniques are characterized by mold forming of the foamed insulating jacket although such a process is limited as to production capabilities and is accordingly expensive. Another prior art technique which has been utilized is to extrude the foamable liquid inside of an enveloping jacket as the pipe lays in place in a ditch along the pipeline right of way. Machines have been developed for lifting the pipeline out of the ditch a sufficient distance to allow extrusion of the foamed insulating jacket and then replacement of the pipe into the ditch. Such an "over the ditch" process does not provide for optimum control over cell structure and compressive strength of the end product.

Another prior art technique which has been attempted is to spray a foamable liquid onto the pipe as it is advanced longitudinally and rotated about its longitudinal axis. Such spray foaming techniques have heretofore suffered from an inability to accurately control the thickness of the foamed insulation as well as the cell structure and compressive strength of the final product.

SUMMARY OF THE INVENTION

A method of applying a foamable liquid to a cylindrical object comprises moving the object along its longitudinal axis, simultaneously rotating the object about said longitudinal axis and spraying a foamable liquid onto the object. The rising foam is wrapped with a protective sheet material before the rising foam has completely set. The wrapping step includes applying sufficient pressure to the at least partially risen foam, through the sheet material, to increase the density of the foam in the area of its outermost surface.

The marking method of the invention utilizes the heat from the exothermic reaction of the rising foam. A marking liquid characterized by undergoing vaporization at a temperature below the maximum temperature of the foam is applied to an object simultaneously with the application of the foam. The foamable liquid is allowed to rise and it will rise to a greater degree at the point of application of the marking liquid as a result of vaporization of the latter during formation of the foam.

The pipe handling apparatus of the invention is characterized by an inflatable member having a casing formed from yieldable rubber-like material and presenting a rounded surface. The inflatable member is adapted to be inflated to a pressure sufficient to support at least a portion of the weight of a length of pipe without damaging the foam insulation.

The method of handling pipe coated with foam insulation, immediately after the coating operation is complete, comprises positioning an inflatable member beneath the coated pipe and inflating it to a pressure sufficient to support at least a portion of the weight of the coated pipe without damage to the foam insulation.

It is, therefore, a primary object of the present invention to provide a method of applying foamed insulation to cylindrical objects wherein the foam is first sprayed onto the pipe in liquid form and then pressure is applied to the risen foam to give it a uniform thickness and to provide the desired density at the surface without adversely affecting the cell structure of the remainder of the foam.

Another object of the invention is to provide a method for coating cylindrical objects with foamed insulation wherein the insulation may be adequately protected from external damage by wrapping it with a tape product or an extruded coating, or by wrapping with other sheet material and spraying a protective coating.

Still another important aim of this invention is to apply foamed insulation to cylindrical objects utilizing high production techniques associated with spraying the foam onto the surface of the object but avoiding the problems of lack of uniformity in the final product heretofore associated with spray foaming techniques.

As a corollary to the above aim, an important objective of the invention is to increase uniformity in the final foamed product by spraying the foamable liquid onto the object in a wide pattern thereby applying only a very small quantity of foamable liquid to the object during each revolution of it but continually building up the total thickness of the liquid by rotating the object faster than its speed of forward advancement.

Another objective of this invention is to provide a method for applying foamed insulation to pipe wherein a tape or other product may be utilized to cover the foamed insulation thereby reducing the cost of the insulated coating over what it would be if more expensive preformed jackets were utilized as the protective outer layer.

Still another object of this invention is to provide a method for marking an area on an object being coated with a foamable liquid whereby the area may easily be found after the foam has risen and envelops the object.

Another aim of the invention is to provide a method for marking an object being coated with foamable liquid wherein the marking technique in no way affects the quality of the foamed insulation outside of the limited area to which it is applied.

Still another objective of the invention is to provide a method for marking an area on an object being coated with a foamable liquid wherein the marking technique in no way interferes with the production of the foamed final product in a continuous process.

An important aim of this invention is also to provide a method and apparatus for handling pipe which has been coated with foamed insulation which will in no way damage the coating.

As a corollary to the above object, an aim of the invention is to provide a method and apparatus for coating foamed insulated pipe wherein an inflatable member is filled with air to a pressure which will support at least a portion of the weight of the coated pipe without damaging the foamed insulating coating.

It is also an object of this invention to provide a method and apparatus as set forth in the preceding two objects wherein a series of inflatable members are used to support a pipe which has just been coated with foam insulation with the inflatable members being filled with air to increasing pressure along the line of advancement of the coated pipe.

Other objects of the invention will be made clear or become apparent from the following description and claims when read in light of the accompanying drawings wherein:

FIG. 2 is a top plan view of the coating line wherein foamed insulation is applied according to the process of the present invention;

FIG. 3 is an enlarged cross-sectional view taken along line 3—3 of FIG. 2;

FIG. 4 is an enlarged elevational view looking in the direction of arrows 4—4 of FIG. 2;

GENERAL STATEMENT OF THE INVENTION

Figure 1:
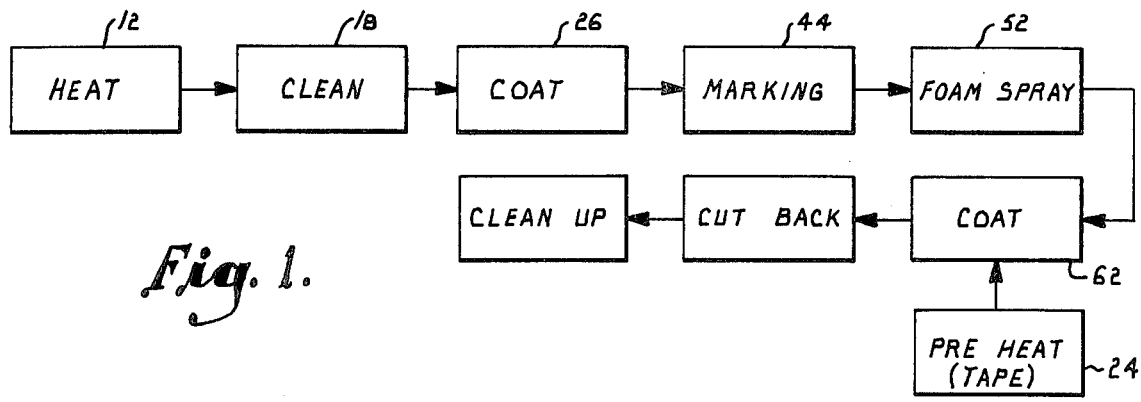
FIG. 1 is a diagrammatic flow chart illustrating the steps involved in the coating process of the present invention.

In its general aspect, the present invention contemplates that pipe to be covered with foam insulation will first be prepared by cleaning the surface to remove scale and dirt. This may be accomplished in a number of ways well known in the art including shot blasting, wire brushing, heating or some combination thereof.

It is desirable in most instances to provide a protective corrosion coating to the pipe surface before it is covered with foam insulation although this is not required for the present invention. The insulating foam may be applied directly to the bare pipe. If a corrosion protective coating is applied, this may comprise any of the well-known coatings in the industry including tape, extruded coatings, coal tars, epoxies and other so-called thin mil coatings. Preferably, in order to provide for a continuous process, a number of joints of pipe are coupled together in end-to-end relationship and advanced past the coating station. If for any reason, however, it is necessary to coat only a single length of pipe at one time, such a variance may be accomplished with the present invention.

A foamable liquid is sprayed onto the pipe which may or may not have previously been provided with a corrosion protective coating. The foamable liquid is applied to the pipe using one or more spray nozzles to distribute the liquid over a wide area, preferably at least 45° to 60° (relative to a planar surface). In this manner only a small quantity of foamable liquid is applied to the pipe during any one revolution and, as the pipe continues to advance, the liquid foam rises into foamed insulation.

Various formulations for liquid foam may be utilized in the process of the present invention depending upon the desired density and cell structure of the end product. A particularly useful formulation is three pound density urethane foam utilizing freon as the blowing agent. It has been found that the foamable liquid used in the process of the invention should have a cream time, i.e., the time between the application and the time the foam begins to rise, of from 2 to 5 seconds. Full rise should occur between 4 and 30 seconds and the foamed layer should be capable of supporting its own weight (and the weight of the pipe) within about 45 seconds to no more than about 3 minutes.

After the foam has substantially risen, an outer layer of sheet material is wrapped around the foamed insulation to apply pressure to the rising foam to compact it and increase its density at the surface area above what it would be if the foamed was allowed to rise uninhibited. This wrapping step is carried out between the time when rise of the foam is about 75% complete until within 15 seconds subsequent to completion of the rise but while the foam is still deformable. The sheet material utilized for this purpose will vary depending upon the desired end product. If the sheet material is to also serve as an outer moisture barrier and provide additional corrosion protection for the pipe, a corrosion protective tape or extruded polyethylene or polypropylene type of coating may be employed. On the other hand, if the sheet material is not required to serve as a vapor barrier or is not intended to provide additional corrosion coating, a material such as fiberglass or its equivalent may be employed. In some instances, a material such as fiberglass is used and a corrosion protective coating or vapor barrier coating is sprayed, dipped, extruded, taped or otherwise applied over the sheet material. In any instance, however, the pressure applied through the sheet material should be sufficient to increase the density of the foam, at least in approximately the outer 25% of the total foam thickness, by about 10 to 25%. To accomplish this end, the layer of sheet material should be applied from a point in time when the rise of the foam is about 75% complete to within 15 seconds subsequent to completion of the rise but while the foam is still deformable.

Another modification in the method of the invention is to treat the inner corrosion protective coating that is applied directly to the pipe electrostatically to bring about oxidation of the surface thereby promoting adhesion between the foam insulation and this inner coating. The foamable liquid itself may be electrostatically sprayed to minimize waste and promote adhesion.

Still another modification of the process of the invention is to apply approximately 75 to 90% of the total thickness of the foam insulation desired in one application and allow this quantity to completely rise and partially set. A second spray head is then employed and positioned underneath the sheet material which is used to increase the density of the outer surface of the foam. The remaining quantity of foamable liquid needed to complete the insulation layer is then sprayed beneath the sheet material as the latter is wound around the first thickness of foamed insulation. In this instance, the necessary pressure to increase the density of the foam insulation results almost entirely from the fact that the foam is caused to expand within a confined area. In this alternative embodiment of the invention, it is desirable to use a foam of a higher density in the final layer to improve the structural strength of the insulating layer as a whole.

When the protective outer layer is applied after the sheet material is wrapped around the rising foam, various types of coatings may be employed. The outer layer may be sprayed, extruded, dipped, or wrapped over the previously applied sheet material.

In the general aspect of the method of marking an object covered by foamable liquid, as contemplated by the invention, there is applied to the object either ahead of or simultaneously with the foamable liquid a marking liquid characterized by undergoing vaporization at a temperature below the maximum temperature of the foam during the exothermic reaction which characterizes the rising. A suitable marking liquid is an organic solvent based paint which, in the case of pipe being covered with insulating foam, is sprayed onto the pipe immediately ahead of the foam.

The foamable liquid is allowed to rise, thus resulting in the foam rising to a greater degree at the point of application of the marking liquid because of vaporization of the latter during formation of the foam. This will result in a ring of larger diameter than the main body of foam being formed in the foam insulation at the area where the marking liquid was applied.

The method of marking employed in the present invention is particularly useful in locating the ends of joints of pipes which have been coupled together to permit a continuous coating process but which need to be separated before shipping the pipe to the lay contractor. By using the method of the invention, the ends of the pipe may be quickly located and the insulating foam removed from the ends for a distance to accommodate welding together.

The apparatus for handling pipe coated with foam as contemplated by the invention employs a series of inflatable members adapted to be inflated to support a portion of the weight of a length of pipe without damaging the foam. Each member is of generally circular configuration and includes a yieldable rubber-like material that presents a rounded outer surface. Two members are disposed in side-by-side relationship to present a carriage for supporting a portion of the weight of a length of pipe coated with foam.

A plurality of the inflatable members are disposed along the path of travel of a length of pipe and each successive member or pair of members is inflated to a slightly higher pressure so as to accommodate more weight of the coated pipe. Thus, the pipe handling method contemplates positioning an inflatable member beneath the coated pipe and inflating the member to a pressure sufficient to support only a portion of the weight of the pipe without damage to the foam insulation, and positioning a second inflatable member downline from the first member and inflating the second member to a pressure greater than the pressure of the first member to support a greater weight yet still without damage to the insulative foam.

DESCRIPTION OF THE PREFERRED EMBODIMENT

Referring initially to FIGS. 1 and 2 of the drawings, a number of lengths of pipe 10, commonly referred to as "joints," are coupled together in end-to-end fashion and passed by a heating station 12 which utilizes a burner 14 to heat the surface of the pipe to the vicinity of 125° F., thereby driving off moisture and loosening some of the scale which may be on the pipe. Pipe 10 is advanced along its longitudinal axis while being rotated by a conveyor system comprising a plurality of pairs of rotating wheels 16 which are disposed in side-by-side relationship and slightly canted.

The pipe is advanced past a cleaning station 18 where a rotating wire brush 20 engages the surface of the pipe to remove dirt, rust, and other contaminants.

Next, the pipe is wrapped with a corrosion protective layer of tape 22. Tape 22 is applied at a station 26 comprising a mounting standard 28 having spindles 30 for holding a first roll of tape 22a and a second roll of tape 22b. Tape 22 is threaded over a tensioning device 32 comprising a rotatable arm 33 which is retarded in rotation by a brake 34 and two stationary guides 36. Tape 22 is preferably a self-adhering resinous sheet. It normally includes a metal corrosion protective layer such as butyl rubber that is applied next to the metal and a layer of stronger, more structural, material such as polyethylene that serves as a carrier for the butyl and also acts as a vapor barrier. A particularly useful tape construction is one having a thickness of 13 mils including 9 mils of polyethylene and 4 mils of butyl rubber.

A wheel 38 mounted on an arm 40 rides along the layers of tape 22 to hold pipe 10 in place. The tape is preferably applied in a spirally wound pattern with 10 to 60% overlap.

To facilitate advancement of the pipe 10 in a longitudinal direction, the line of juncture between successive joints coupled in end-to-end relationship is taped for an area of several inches on either side of the juncture immediately after the pipe passes taping station 26. This coupling tape is indicated by the numeral 42 in the drawings and is preferably of a contrasting color to facilitate identification of the line of juncture when the foamed insulation is removed.

After the coupling tape has been applied, the pipe is advanced past a marking station 44 where an organic solvent base paint is sprayed onto the pipe through a nozzle 46. Lines 48 and 50 leading from nozzle 46 bring the paint and air respectively to the nozzle. Nozzle 46 is operated periodically to apply the marking paint at the area where coupling tape 42 is wrapped around two successive lengths of pipe with the paint preferably being applied in a narrow band 47 corresponding to the line of juncture.

Immediately after marking station 44, the pipe passes by a spray nozzle 52 to which a foamable liquid and a suitable blowing agent are directed through lines 54 and 56.

Figure 5:
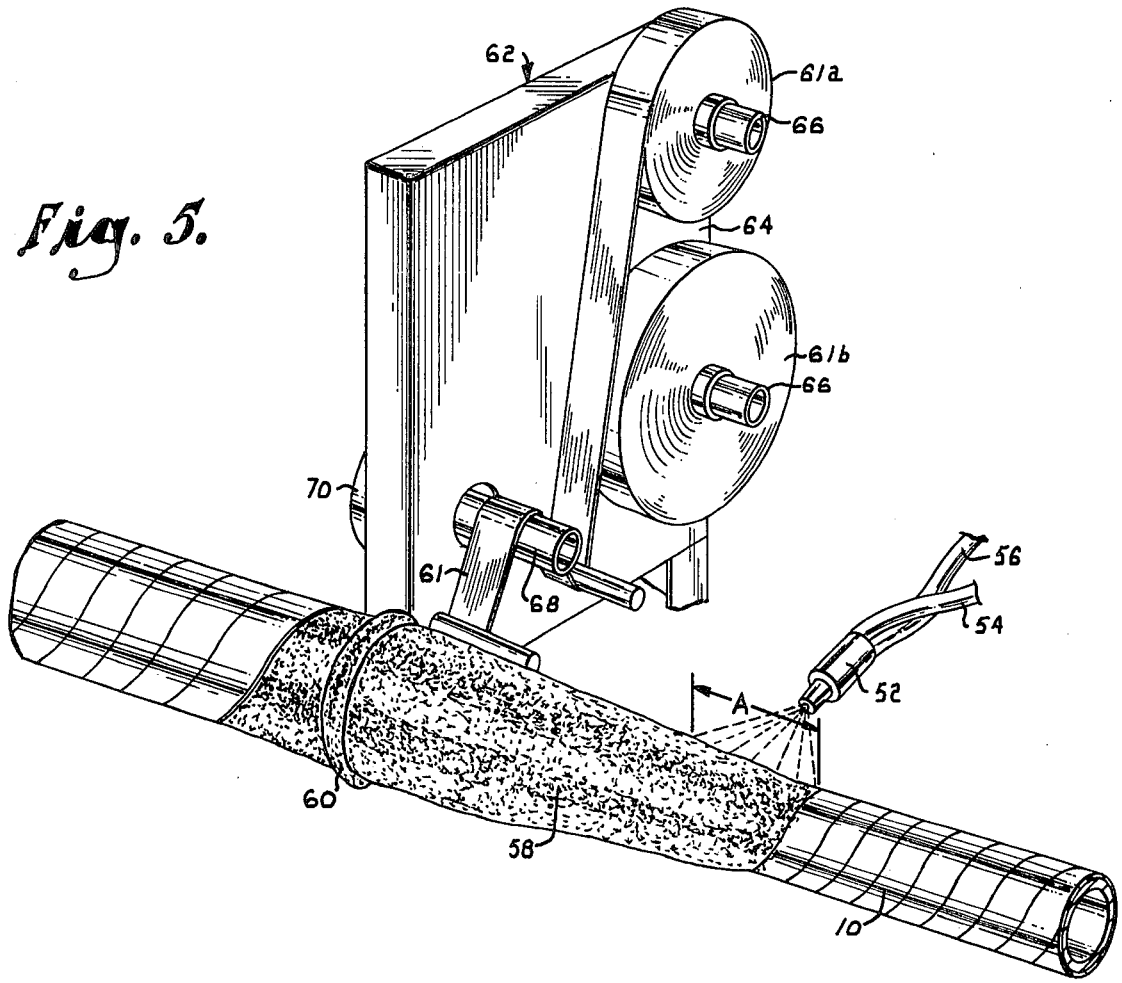
FIG. 5 is an enlarged perspective view of the spray head and wrapping station which form a part of the apparatus for applying a foamed insulative coating according to the process of the present invention.

As best illustrated in FIG. 5, nozzle 52 is positioned in a horizontal plane at approximately the same level as the horizontal bisector of pipe 10 being coated. The foamable liquid is sprayed onto the pipe in a relatively wide band of 40° to 60° designated by the letter A in FIG. 5 so as to apply only a small quantity of foamable liquid to the pipe during any one revolution. As the pipe continues to advance, the liquid foam rises into foamed insulation designated by the numeral 58 in FIG. 5. A ring gear 60 is formed in the foamed insulation at the area where marking paint 47 was applied.

After the foam has substantially risen, an outer layer of tape 61 is applied at a second taping station 62. Tape 61 is of the same type as tape 22 previously described except of high structural properties to provide mechanical protection to the completed product. For example, tape 61 may comprise a total thickness of 25 mils with 20 mils of polyethylene and 5 mils of butyl rubber. The tape 61 is preheated to about 120°–135° F. at station 24. Taping station 62 comprises a standard 64 provided with spindles 66 for holding rolls of tape 61a and 61b. Tape 61 passes under a rotatable tensioning arm 68 before it passes onto the foamed insulation 58. Arm 68 is constructed in the same manner as rotatable arm 33 previously described including a brake 70 to provide the necessary tension on the tape 61.

It is important that sufficient tension be applied on tape 61 as it is wrapped around foamed insulation 58 to apply pressure to the risen foam to compact it and increase its density, in the outer one-fourth of its total thickness, above what it would be if the foam was allowed to rise uninhibited. The pressure applied through tape 61 should be sufficient to increase the density by at least about 10% and preferably not more than about 25% in the outer 25% of the foam. The tape is wrapped around the foamed insulation in a spiral pattern with 10% to 60% overlap to assure complete coverage.

Figure 7:
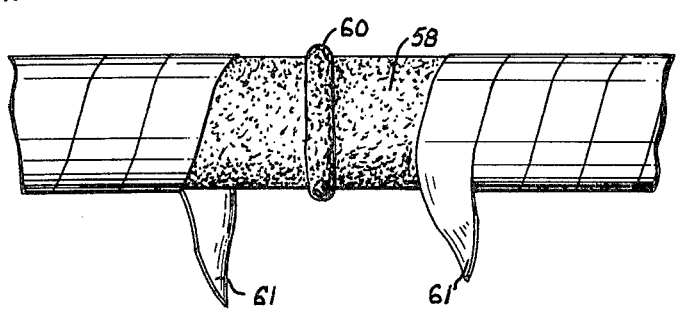
FIG. 7 is an enlarged elevational view showing the manner in which the line of juncture between two lengths of pipe is marked.

The next step is to remove the foam insulation 58 for a distance back several inches from each end of the pipe being coated so as to allow adequate room for welding the pipe together as the pipeline is formed. This, of course, makes it mandatory that the line of juncture between successive joints of pipe which have been coated with the foamed insulation and wrapped with tape 61 be able to be located. This is the function of marking ring 60 which projects outwardly to a greater circumference than the remainder of the coating on the pipe. Thus, the protective tape 61 and ultimately the foamed insulation 58 may be cut away from the pipe in the manner illustrated in FIGS. 7 and 8.

Figure 8:
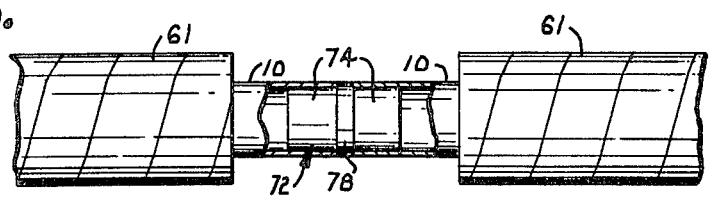
FIG. 8 illustrates the manner in which two lengths of pipe are coupled together for application of the foamed insulative coating.

FIG. 8 also illustrates the coupler 72 used to join two lengths of pipe in end-to-end relationship. A ferrule 74 of a diameter approximately equal to the internal diameter of pipes 10 is fitted in a tight friction fit within the pipe joints. A spacer 78 is disposed midway along the length of ferrule 74 to occupy the space between the ends of the two pipe joints 10.

Figure 6:
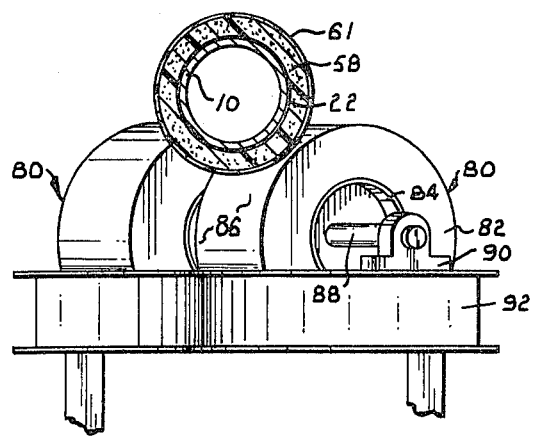
FIG. 6 is an enlarged cross-sectional view looking in the direction of arrows 6—6 of FIG. 2.

As the coated pipe advances past the final taping station 62, it will be received by two inflatable wheels designated generally by the numeral 80 (FIG. 6). Each wheel 80 comprises a casing 82 of generally circular configuration mounted on a rim 84. Each casing 82 is formed from a yieldable rubber-like material with a relatively smooth rounded outer surface 86. Two members 80 are disposed in side-by-side relationship and canted slightly to achieve longitudinal advancement of the pipe while the members are rotating. To this end, each of the rims 84 is mounted on a shaft 88 with the end of the shafts being received in a pillow box bearing 90. A framework 92 mounts the entire assembly in adjustably spaced relationship to the supporting surface.

Inflatable members 80 are filled with air to a pressure sufficient to support only a portion of the weight of the coated pipe without damaging the foamed insulation 58 or protective tape 61. The first pair of members 80 which receive the coated pipe as it emerges from the taping station 62 are inflated to a pressure sufficient to support only a portion of the weight of the pipe without damaging insulation 58 or tape 61. Since this first set of inflatable members is supporting only a very small portion of the total weight of the coated pipe, the air pressure is relatively low. This of course is advantageous since the foam 58 is most susceptible to damage at this point when it may not be completely cured. As the pipe advances further, the foamed insulation 58 will become more fully cured and, accordingly, the air pressure within the subsequent pairs of members 80 may be increased so that each pair of members 80 is capable of supporting a larger portion of the total weight of the pipe than the previous pair. This of course is advantageous since, as more of the weight of the coated pipe is placed on the members, it is necessary to have a higher pressure to support the pipe.

It has been found that a particularly useful liquid foam is three pound density urethane foam utilizing freon as the blowing agent. The liquid constituents are preheated to about 100° F. before reaching spray nozzle 52. The liquid is sprayed through an orifice of approximately 0.04 inch diameter at a pressure of from 600 to 2000 pounds per square inch. It has been found desirable to utilize a fan spray width (A in FIG. 5) of 40° to 60°. For 6 to 8 inch diameter pipe a forward speed of advancement between 3 and 4 inches per revolution is satisfactory to build up a foamed insulating layer of one to three inches in thickness.

The foamable liquid used in the process of the present invention should have a cream time, i.e., the time between application and the time the foam begins to rise, of from 2 to 5 seconds. Full rise should occur between 4 and 30 seconds and the foamed layer should be capable of supporting its own weight (and the weight of the pipe) within about 45 seconds to no more than about 3 minutes. The outer layer of protective tape may generally be applied from a point in time when the rise of the foam is about 75% complete to within 15 seconds subsequent to completion of the rise but while the foam is still deformable.

It will be appreciated that other modifications of the invention may be practiced without departing from the scope thereof which is intended to be limited only by the appended claims.

Having thus described the invention, we claim:

1. A method of applying a foamable liquid to a cylindrical object, comprising:
    moving the object along its longitudinal axis;
    simultaneously rotating the object about its longitudinal axis;
    first spraying the foamable liquid onto the object;

allowing the foamable liquid to rise substantially on the object; and wrapping the foamable liquid with a flexible sheet material while the risen foam is still deformable, said wrapping step including applying sufficient pressure to the risen foam through the sheet material to increase the density of the foam only in the vicinity of the foamed surface.

2. A method as set forth in claim 1, wherein the step of applying pressure to the risen foam comprises applying sufficient pressure to increase the final density thereof in the vicinity of the foamed surface by about 10 to 25% above the density if the foam was allowed to rise uninhibited.

3. A method as set forth in claim 2, wherein said step of applying pressure comprises applying sufficient pressure to increase the density of the outer one-fourth of the total foam thickness by about 10 to 25%.

4. A method as set forth in claim 2, wherein the step of applying pressure to the risen foam comprises tightly wrapping the sheet material over the foam to compress it thereby achieving the increase in density.

5. A method as set forth in claim 2, wherein the step of applying pressure to the risen foam comprises wrapping the foam before it has completely risen thereby applying pressure by causing the foam to expand within the confines of said wrapping.

6. A method as set forth in claim 2, wherein is included the step of applying a protective coating to the object ahead of said spraying step.

7. A method as set forth in claim 6, wherein is included the step of heating the surface of the object to at least about 125° F. prior to said spraying step.

8. A method as set forth in claim 7, wherein is included the step of heating the foamable liquid to at least about 100° F. prior to said spraying step.

9. A method as set forth in claim 8, wherein said spraying step comprises spraying a foamable liquid having a density of between about 1.8 and 6.0 pounds per cubic foot.

10. A method as set forth in claim 9, wherein said sprying step comprises spraying a foamable liquid having a cream time between about 2 and about 5 seconds, and a full rise time between about 4 and about 30 seconds.

11. A method as set forth in claim 2, wherein the step of spraying the foamable liquid comprises spraying the liquid from a stationary position which is in a horizontal plane passing through the longitudinal axis of the pipe.

12. A method as set forth in claim 1, wherein said object comprises an open-ended length of pipe, said foamable liquid is characterized by an exothermic reaction during the foaming process, and wherein is included the step of coupling a plurality of pipe lengths together in end-to-end relationship, there being further included the steps of applying to the length of pipe at the area of joinder with another length of pipe and together with said spraying step a marking liquid characterized by undergoing vaporization at a temperature below the maximum temperature of the foamable liquid during said exothermic reaction, and allowing the foamable liquid to rise wherein the resulting foam will rise to a greater degree at the point of application of said marking liquid as a result of vaporization of the latter during formation of the foam.

13. A method as set forth in claim 12, wherein the step of applying said marking liquid comprises applying the liquid around the circumference of the length of pipe.

14. A method of marking a point on an object being covered by a foamable liquid wherein the formation of foam occurs in an exothermic reaction, said method comprising:

applying to the object together with the foamable liquid a marking liquid characterized by undergoing vaporization at a temperature below the maximum temperature of the foam during said exothermic reaction; and allowing the foamable liquid to rise wherein the resulting foam will rise to a greater degree at the point of application of said marking liquid as a result of vaporization of the latter during formation of the foam.

15. A method as set forth in claim 14, wherein the step of applying the marking liquid comprises applying said marking liquid around the perimeter of the object being covered by said foamable liquid.

16. A method as set forth in claim 15, wherein the step of applying a marking liquid comprises applying an organic liquid.

17. A method as set forth in claim 14, wherein said object comprises two lengths of open-ended pipe joined together in end-to-end relationship, said point comprising the area of juncture between said lengths of pipe, and said applying step comprising spraying said marking liquid around the circumference of the lengths of pipe within said area.

18. A method of handling pipe coated with foam insulation immediately after the coating operation is completed and before the foam is completely cured, said foam being characterized by an absence of any rigid protective covering, said method comprising:

positioning an inflatable member beneath the coated pipe; and inflating said member to a pressure sufficient to support only a portion of the weight of the coated pipe without damage to the foam insulation.

19. A method as set forth in claim 18, wherein is included the steps of positioning a second inflatable member in the path of travel of the coated pipe down line from the location of the first member, and inflating said second member to a pressure greater than the pressure of the first member to support a greater portion of the total weight of the coated pipe without damage to the foam insulation.

* * * * *